Patented Nov. 22, 1938

2,137,830

UNITED STATES PATENT OFFICE 2,137,830

DYE STAIN

Julius F. T. Berliner, Wilmington, Del., assignor to E. I. du Pont de Nemours & Company, Wilmington, Del., a corporation of Delaware No Drawing. Application July 10, 1935, Serial No. 30,770

9 Claims. (Cl. 134—48)

This invention relates to stains and more particularly to solvents for dye stains utilized in staining wood and like materials in which relatively great penetration by the dye is desired.

One of the troublesome characteristics of the dye stains previously used, or more correctly of the solvents therefor, has been the grain raising of the wood attendant upon their use. Raising of the wood grain is particularly undesirable inasmuch as it requires sanding, and/or other operations for its removal. Numerous proposals have been made, therefore, in the past suggesting solvents for the dyes which would give the desired penetration of the dye but which would not have this undesirable grain-raising effect.

A further disadvantage of previously suggested dye stain solvents has been the fact that, even though such solvents, e. g., methanol, might be desirable from the absence of grain-raising standpoint, the difficultly soluble material present in or as the dye stain was not satisfactorily dissolved. In some instances it has been found that upon standing the difficultly soluble material even becomes flocculent, tends to swell, and gives considerable settling difficulty.

With a view toward overcoming these and similar disadvantages of the prior art, it is an object of the present invention to provide an improved dye stain solvent.

It is a further object to provide a new and improved complete dye stain solution and method for its preparation.

Other objects and advantages of the invention will be apparent by reference to the following specification wherein its preferred details and embodiments are set forth.

According to this invention a new and improved dye stain solution or composition, most satisfactorily meeting all the requirements of an efficacious dye stain, is prepared by adding a known spirit soluble dye utilized for wood staining to methanol and mixing therewith a relatively small quantity of formamide, urea, ammonium formate or mixtures thereof. I have found that a dye stain solution composed of such ingredients gives decidedly better results in wood staining operations, showing unexpectedly improved solubility and color effect characteristics. The dye stain solution of this invention evaporates dry, leaves no observable residue, does not raise the grain of the wood and its penetration is superior to previously proposed dye solutions.

I have found a solution of dye, methanol, formamide and ammonium formate to be the most efficacious although solutions of dye, methanol, formamide and urea, or dye, methanol and urea, or dye, methanol, ammonium formate and urea or mixtures of these materials are highly desirable and superior to previously proposed dye stain compositions.

The proportions of materials utilized according to this invention may be varied over a wide range although I have found that from ½ to 1½ grams of ammonium formate per 100 cc. of methanol, or about 2.8 to 21 grams formamide per 100 cc. of methanol, or 1½ to 4 grams of urea per 100 cc. of methanol gave the best results. In the preferred combination, previously referred to, I find that superior results are obtained by utilizing a solution containing about ¾ gram of ammonium formate and 7 grams formamide per 100 cc. of methanol. To these solutions there is added, of course, the amount and type of dye requisite for the concentration and type of stain desired, i. e. sufficient dye stain to produce a substantially saturated dye stain solution such as commonly used in the art.

I have tested a great number and variety of the spirit soluble dyes used in wood staining in connection with the solvents of this invention and have found them, without exception, to be dissolved to a much greater extent than in the case of other dye stain solvents. Thus, for example, methanol itself has previously been quite widely used as a dye stain solvent, but, in comparison with the solvent of the present invention it is less than one-fourth as effective.

As a further feature of this invention I have found that any corrosive action of these solutions upon ferrous materials with which they come in contact such as containers and materials used in handling and transporting the solutions can be greatly reduced if not wholly prevented, by addition thereto of a small quantity of an alkali nitrite, i. e. an alkaline earth or alkali metal nitrite, such as sodium or potassium nitrite. Thus, for example, I have found that a methanol solution of dye stain containing ammonium formate and formamide in the proportions of about one ounce ammonium formate per gallon of a 5% formamide by volume methanol solution is wholly non-corrosive to steel if there is added thereto sodium nitrite in the proportions of 0.1 gram thereof per 100 cc. of dye stain solution. The nitrite inhibitor has no effect upon any of the many dyes used in wood staining and, although very satisfactory in the proportions of say 0.01 to 0.5 grams per 100 cc. of dye stain solution or, preferably, in the preparations previously set forth, may be utilized in greater or less concentrations if desired.

Various changes may be made in the details and methods of this invention without departing therefrom or sacrificing any of the advantages thereof.

I claim:

1. A dye stain composition comprising a solution, substantially saturated with a staining dye, of methanol and a relatively small quantity, not less than 0.5 gram of ammonium formate per 100 cubic centimeters of methanol.

2. A dye stain composition comprising a solution, substantially saturated with a staining dye, of methanol and a relatively small quantity, not less than 2.8 grams of formamide per 100 cubic centimeters of methanol.

3. A dye stain composition comprising a solution, substantially saturated with a staining dye, of methanol and a relatively small quantity, not less than 1.5 grams of urea and 2.8 grams of formamide per 100 cubic centimeters of methanol.

4. A dye stain composition comprising a solution, substantially saturated with a staining dye, of methanol and a relatively small quantity, not less than 1.5 grams of urea and 2.8 grams of formamide and 0.5 gram of ammonium formate per 100 cubic centimeters of methanol.

5. A dye stain composition comprising a solution, substantially saturated with a staining dye, of methanol and a relatively small quantity, not less than 1.5 grams of urea and 2.8 grams of formamide per 100 cubic centimeters of methanol, and 0.01 gram of an alkali nitrite for 100 cubic centimeters of dye stain solution.

6. A dye stain composition comprising a solution, substantially saturated with a staining dye, of methanol and a relatively small quantity, not less than 1.5 grams of urea and 2.8 grams of formamide and 0.5 gram of ammonium formate per 100 cubic centimeters of methanol, and at least about 0.01 gram of alkali nitrite per 100 cubic centimeters of dye stain solution.

7. A dye stain composition comprising a solution, substantially saturated with a staining dye, of methanol and a relatively small quantity, not less than 2.8 grams of formamide and 0.5 gram of ammonium formate per 100 cubic centimeters of methanol and at least about 0.01 gram alkali nitrite per 100 cubic centimeters of dye stain solution.

8. A dye stain solvent comprising a solution of methanol and a relatively small quantity, not less than 0.5 gram of ammonium formate per 100 cubic centimeters of methanol.

9. A dye stain solvent comprising a solution of methanol and a relatively small quantity, not less than 2.8 grams of formamide per 100 cubic centimeters of methanol.

JULIUS F. T. BERLINER.